June 6, 1967  N. G. BRANSON  3,323,352

CONTROL CIRCUIT FOR RESONANT SENSING DEVICE

Filed Jan. 4, 1965

INVENTOR.
NORMAN G. BRANSON

BY Ervin B. Steinberg

United States Patent Office 3,323,352
Patented June 6, 1967

3,323,352
CONTROL CIRCUIT FOR RESONANT
SENSING DEVICE
Norman G. Branson, Stamford, Conn., assignor, by mesne assignments, to Branson Instruments, Incorporated, Stamford, Conn., a corporation of Delaware
Filed Jan. 4, 1965, Ser. No. 423,214
5 Claims. (Cl. 73—67.1)

ABSTRACT OF THE DISCLOSURE

A measuring circuit for a resonant sensing device which is brought in contact with an object whose hardness is to be measured, wherein the circuit includes a diamond tipped magnetostrictive rod, electromagnetic means for vibrating the rod and piezoelectric means coupled to said rod for providing a feedback signal, an amplifier connected between said electromagnetic and piezoelectric means for sustaining said rod at its resonant mode of vibration, and the series connection of a shaping circuit, multivibrator, limiter, frequency-to-current converter, and a meter coupled to the amplifier for providing a signal commensurate with the frequency of the oscillations.

---

This invention refers to a resonant sensing device which is adapted to determine or test the physical properties and characteristics of a test piece. More specifically, this invention has reference to an electronic circuit for use in combination with such a resonant sensing device, which circuit is adapted to drive the sensing device and simultaneously to provide an indication of the characteristics tested.

In the prior art, particularly in U.S. Letters Patent No. 3,153,338, issued to C. Kleesattel, dated Oct. 20, 1964, entitled, "Resonant Sensing Devices," there is described a novel device for determining and measuring physical properties of material, such as the hardness of a piece of metal and the like. Briefly, the device comprises a slender elongated rod of magnetostrictive material which is vibrated longitudinally under the influence of an electromagnetic coil encircling the rod and receiving its energy from a high frequency generator.

This rod vibrates, or resonates, in its free or non-constrained condition at a given frequency. When, however, one diamond tipped end of the rod is brought in forced contact with a material the hardness of which is to be measured, this one end is constrained and a shift in the resonant frequency to a higher value occurs due to the shortening of the effective length of the rod. Assuming that the force which is applied to cause the contact engagement between the diamond and the test piece remains constant, then a soft material is characterized by a deeper penetration of the diamond tip than a hard material and, hence, the resonating frequency increases as the hardness of the material decreases. The shift in resonant frequency from the free condition to the constrained rod condition is a measure of the hardness of the material under test and may be measured in several ways, such as by a manually tunable high frequency oscillator connected to a frequency balancing bridge circuit, a pickup coil coupled to the rod and connected to a vacuum tube voltmeter and provisions for tuning the oscillator to maximum deflection on the meter, and the like.

Yet the provision of a high frequency oscillator in combination with bridge circuits or meters for measuring frequency shifts has proven cumbersome and difficult. Instrumentation of this type is not conducive to providing a portable test instrument which is readily usable in production areas and/or by persons possessing only average skill in the handling and maintenance of electronic equipment. Moreover, high frequency oscillators and balancing circuits are expensive, bulky and require extreme care not only in the usage thereof, but also in the interpretation of the results.

One of the principal objects of this invention, therefore, is the provision of a resonant sensing device in combination with a simplified electronic read-out circuit.

Another object of this invention is the provision of a relatively simple electrical circuit for use in combination with a resonant sensing device of the type described heretofore, which circuit is characterized by utmost simplicity, ease of operation and maintenance, and the absence of complicated parts and components.

Another object of this invention is the provision of an electrical circuit for use in combination with a resonant hardness tester, the circuit being adapted to drive the tester and to energize a direct-reading meter which can be calibrated in units of hardness.

Still another object of this invention is the provision of an electrical circuit for driving a resonating probe at various frequencies, sustaining the particular resonant frequency, and providing an indication of such frequency without the need for manual tuning controls.

A further object of this invention is the provision of an electronic circuit comprising an electronic feedback amplifier coupled to an electromagnetic coil which resonates a probe, said amplifier receiving a feedback signal from a piezoelectric pickup coupled to said probe and providing a signal responsive to the vibration of said probe to a measuring circuit for indicating a value commensurate with the resonant frequency of said probe.

Still further and other objects of this invention will be more clearly apparent by reference to the following description when taken in conjunction with the accompanying drawings in which.

Figure 1:
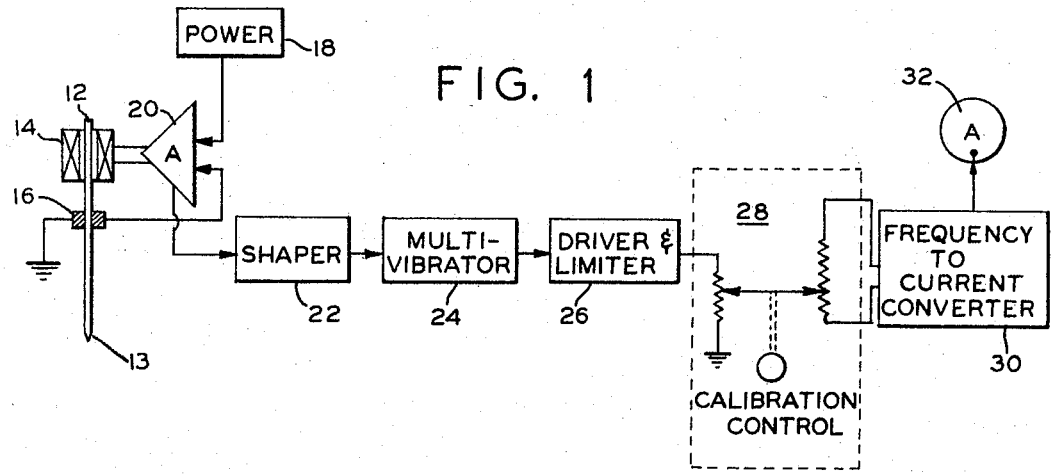
FIGURE 1 is a schematic block diagram of the entire arrangement.

Referring now to the figures and FIGURE 1 in particular, numeral 12 identifies a slender rod made of magnetostrictive material which is adapted to be set into longitudinal oscillatory motion by an electromagnetic coil 14 which encircles the rod. One or more pieces of piezoelectric material, or a bushing of piezoelectric material 16, is bonded to the rod, preferably at its nodal point, to provide an electrical signal which is caused by the vibrations. A diamond tip 13 fastened to one end of the rod is adapted to be brought into forced engagement with the material to be tested, whereby the amount of penetration of the tip under standardized force conditions is a measure of the hardness of the material. As the tip engages the surface of the material to be tested, the effective length of the rod is shortened, causing the rod's natural resonant frequency of vibration to shift upward, which shift, in turn, is a measure of the hardness of the material under test. For a more comprehensive description of this device and the theory thereof reference is made to the above identified patent.

In accordance with this invention, there is provided an amplifier 20, energized from a source of power 18, which delivers electrical energy to the electromagnetic coil 14 for causing magnetostrictive longitudinal vibrations in the rod 12. This vibratory motion is sensed by the piezoelectric transducer 16 to provide an electric feedback signal to the amplifier 20. The amplifier, therefore, operates on a feedback basis similar to a microphone and loudspeaker which face one another, and thus, the rod 12 resonates under susbtantially all conditions at its major mode, its natural frequency, which frequency is apparent in the electrical circuit comprising the amplifier 20, coil 14 and pickup device 16. The amplifier 20, coil 14, piezoelectric pickup 16 and rod 12 form a complete resonating loop circuit.

An alternating current signal corresponding to the resonating frequency is taken from this loop circuit, and in this case from the amplifier, and transmitted to a shaping circuit 22 for triggering a multivibrator 24. The square wave output signal from the multivibrator is applied via a driver and limiter circuit 26 to a calibration control 28, and from there to a frequency-to-current converter 30 (sometimes called discriminator), the latter being a reactance sensitive circuit for deriving a D-C current whose magnitude is a function of the frequency. This current is then applied to a direct current meter 32 for producing a needle deflection proportional to the current, which as explained heretofore, increases with the softness of the material, i.e. the shortening of the effective rod length. In the preferred embodiment the meter has a conventional rotating movement, rated 0 to 100 microamperes, having however its mechanical and electrical zero position moved to the right end of the scale and its scale reading calibrated from left to right in units from 20 to 70 units of Rockwell C. In a typical example the free rod resonates at a frequency of 19.4 kilocycles, at Rockwell C of 65 the frequency is increased to 22.5 kilocycles, and at Rockwell C of 25 the frequency is 24.3 kilocycles. The range of frequency shift for a full range measurement from 10 to 70 units of Rockwell C, therefore, is somewhat less than two kilocycles. Other read-out devices may be used, such as digital meters or printers.

Figure 2:
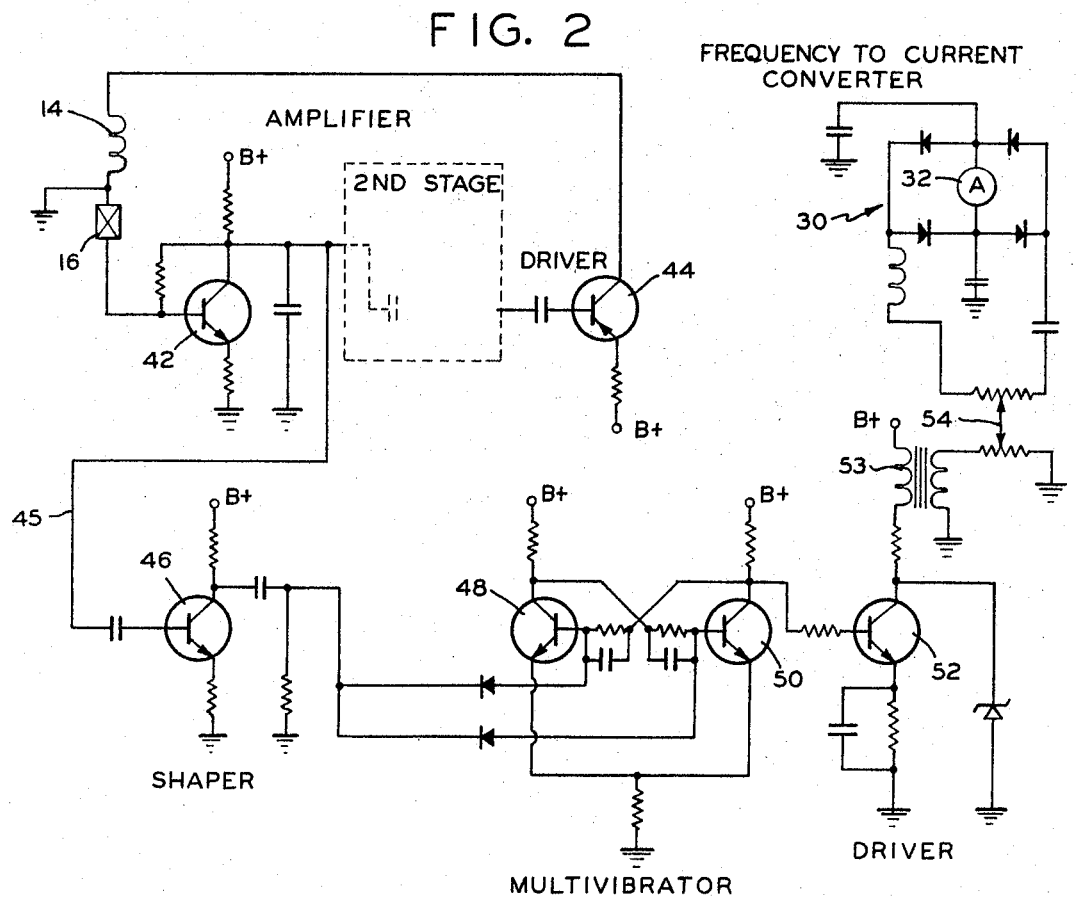
FIGURE 2 is an electrical circuit diagram of the circuit shown in block form in FIGURE 1.

The complete circuit is shown in FIGURE 2 wherein numeral 42 identifies a transistor which forms the preamplifier stage of the multiple stage radio frequency amplifier 20 (FIG. 1) receiving a feedback signal from the piezoelectric pickup 16. The transistor 44 constitutes the output driving stage for driving the electromagnetic coil 14. As stated heretofore, the amplifier, driving coil 14, resonating rod 12 and pickup 16 form a resonating loop which tunes itself to the resonant frequency of the rod. The frequency responsive signal is taken behind the preamplifier stage and is coupled via a conductor 45 to a shaping circuit, comprising a transistor 46 and associated components. From there, the signal is fed to a conventional multivibrator circuit which includes a pair of transistors 48 and 50.

The output from the multivibrator circuit is fed to a driver stage 52 which, via a transformer 53, energizes the frequency-to-current converter 30 and the direct current meter 32. Adjustment means 54 is as a calibration control for the meter. The frequency-to-current converter is essentially a bridge circuit operating on the principle that for a given frequency the control can be set to provide equal amounts of voltage across the inductive reactance branch and the capacitive reactance branch of the circuit, thus causing zero deflection of meter 32. This corresponds to the non-constrained condition of the rod. As the frequency increases, the reactance of the right capacitive branch decreases while that of the left inductive branch increases, thereby providing a resultant D-C current through the meter 32, which current is a measure of the frequency.

It will be apparent that the circuit described hereinabove is characterized by extreme simplicity and ease of operation. The use of expensive and complicated high frequency oscillators is avoided and the circuit disclosed will find its resonant frequency fully automatic, thus eliminating the need for tuning controls which heretofore were necessary to establish the resonant frequency of the rod in its free and constrained condition. Readings are apparent immediately on a direct reading meter.

While there has been described and illustrated a certain specific embodiment of the present invention, it will be apparent to those skilled in the art that various changes and modifications may be made therein without deviating from the broad principle and intent of the present invention, which shall be limited only by the scope of the appended claims.

What is claimed is:

1. A sonic testing device for measuring the hardness of an object comprising in combination:

a transducer assembly which includes a magnetostrictive rod adapted to be sonically vibrated and having one end which is adapted to engage by forced contact the surface of the object;

an electromagnetic means disposed to sonically vibrate, when energized, said rod;

a piezoelectric means coupled to said rod for producing an electrical feedback signal responsive to the vibrations of said rod;

a feedback alternating current amplifying means coupled between said electromagnetic means and said piezoelectric means to provide an alternating current signal to said electromagnetic means in response to the feedback signal from said piezoelectric means;

the series connection of a shaping circuit, a multivibrator, a limiter circuit and a frequency-to-current converter coupled to said amplifying means for providing an output signal whose magnitude is responsive to the frequency of vibrations of said rod, said converter including a capacitive reactance and an inductive reactance circuit branch, and a meter connected to indicate the difference in current through said branches as a function of the frequency of said alternating current signal, such current being a measure of the hardness of the object at the area of engagement of said rod.

2. A sonic testing device as set forth in claim 1 wherein control means are connected in series with said meter, said control means adapted to provide equal amounts of current through said branches for calibrating the meter.

3. A sonic testing device as set forth in claim 1 wherein said meter is a direct current meter connected to said capacitive reactance and inductive reactance circuit branches by rectifying means.

4. A sonic testing device as set forth in claim 1 wherein said electromagnetic means is a coil encircling said rod, and said piezoelectric means is bonded to the rod at a nodal point thereof.

5. A sonic testing device as set forth in claim 1 wherein said meter is provided with a scale calibrated in units of hardness.

References Cited

UNITED STATES PATENTS

| 2,443,668 | 6/1948 | Tagg | 324—82 X |
| 2,576,423 | 11/1951 | Stewart | 73—67.2 |
| 3,153,338 | 10/1964 | Kleesattel | 73—67.1 |
| 3,246,516 | 4/1966 | Maropis | 73—67.1 X |
| 3,289,077 | 11/1966 | Miller | 73—71.4 X |

FOREIGN PATENTS 1,373,720   8/1964   France.

JAMES J. GILL, *Acting Primary Examiner.*

JOHN P. BEAUCHAMP, *Examiner.*